United States Patent [19]

Ciokajlo et al.

[11] Patent Number: 4,900,221
[45] Date of Patent: Feb. 13, 1990

[54] JET ENGINE FAN AND COMPRESSOR BEARING SUPPORT

[75] Inventors: John J. Ciokajlo, Cincinnati, Ohio; Henry B. Ritchie, Ft. Pierce, Fla.

[73] Assignee: General Electric Company, Cincinnati, Ohio

[21] Appl. No.: 285,570

[22] Filed: Dec. 16, 1988

[51] Int. Cl.4 .............................................. F04D 29/60
[52] U.S. Cl. ..................................... 415/142; 60/226.1
[58] Field of Search ................. 415/142, 77; 60/226.1, 60/262

[56] References Cited

U.S. PATENT DOCUMENTS

| | | | |
|---|---|---|---|
| 3,391,540 | 7/1968 | Bauger et al. | 415/77 |
| 3,396,905 | 8/1968 | Johnson | 60/226.1 |
| 3,434,288 | 3/1969 | Petrie | 60/226.1 |
| 3,618,323 | 11/1971 | Needham | 60/226.1 |
| 3,620,009 | 11/1971 | Wilde | 60/226.1 |
| 4,287,715 | 9/1981 | Klees | 60/262 |

OTHER PUBLICATIONS

F110-GE-100 Engine Airflow Diagram, 2/85 Drawing Date.
Installation Handbook for Turbojet Engines, FIGS. 17-4, p. 314, (General Electric Company, First Printing 5/1952).
35 Year-Old Foreign Engine.
18 Year-Old Pratt & Whitney Presentation.
Exoskeletal Structures Concept.

Primary Examiner—Robert E. Garrett
Assistant Examiner—John T. Kwon
Attorney, Agent, or Firm—Douglas E. Erickson; Jerome C. Squillaro

[57] ABSTRACT

A bypass turbofan jet engine subassembly. A row of structural fan stators and a row of structural compressor guide vanes have their outer ends attached to the engine outer duct. The structural stator inner ends are attached by an inner support cone to the outer race of the fan rolling element bearing and the structural guide vane inner ends are attached by another inner support cone to the outer race of the compressor rolling element bearing. The fan and compressor outer races are interconnected by a tie bar. The subassembly eliminates the engine fan and compressor frames.

8 Claims, 1 Drawing Sheet

JET ENGINE FAN AND COMPRESSOR BEARING SUPPORT

CROSS-REFERENCE TO RELATED APPLICATIONS

The inventors of the present invention have concurrently filed a related patent application Ser. No. 285,569 entitled "Jet Engine Turbine Support".

BACKGROUND OF THE INVENTION

The present invention relates generally to bypass turbofan jet engines and more particularly to a bearing support for the fan and compressor of such an engine with the fan at the front (generally called a front-fan engine) which eliminates the need for conventional engine frames.

Front-fan engines derive some of their thrust from a core turbojet engine and some of their thrust from a front fan wherein the outer portion of the airflow from the front fan bypasses the core turbojet engine. Front fans, driven by a section of the core engine's turbine, act like propellers to supply thrust to the engine.

The core turbojet engine includes a compressor followed in order by a combustor, a turbine, and an exhaust nozzle. The compressor compresses incoming air for better combustion of the fuel injected into the combustor. The fuel-air mixture ignites, and the burning gases from the combustor turn the turbine blades to drive the compressor and then exit the exhaust nozzle to supply thrust to the engine. Known front-fan engines generally have two engine frames whose sole purpose is to support the bearings of the front fan and the core turbojet engine's compressor. These engine frames add weight to the engine, and their elimination would result in improved specific fuel consumption and lower manufacturing cost.

The fans and compressors include rotating blades whose tips clear surrounding ducts. The required clearances are determined in part by the radial spring constants of the engine frames. A higher radial spring constant allows a smaller required clearance, thereby decreasing leakage and thus also acting to improve the specific fuel consumption.

It is known, in engines consisting only of a core turbojet engine, to eliminate the engine frame which supports the compressor, and instead the compressor bearing can be supported by a row of compressor guide vanes which act in a dual airflow-guiding and bearing-support role. In other known jet engines, turbine nozzle vanes (or support rods running through the vanes) support a turbine bearing.

However, such expedients have not been available in front-fan engines to support the fan and compressor bearings even though it is desirable to provide such support without the need for heavy engine frames.

In describing the invention, the terminology "structural fan stators" and "structural compressor guide vanes" will be used. For the purpose of this invention, a "structural fan stator" is a fan stator (or portion thereof) which takes a load or is a fan stator enclosing a rod (or the like) which takes a load. Similarly, for the purpose of this invention, a "structural compressor guide vane" is a compressor guide vane (or portion thereof) which takes a load or is a compressor guide vane enclosing a rod (or the like) which takes a load. It is understood that for an engine having a variable stator or guide vane, the pitch controllable portion thereof does not take a load.

SUMMARY OF THE INVENTION

It is an object of the invention to provide a bypass turbofan jet engine having improved specific fuel consumption.

It is another object of the invention to provide such an engine of the front fan type which eliminates the expensive and heavy engine frames supporting the fan and compressor bearings in conventional bypass turbofan jet engine designs.

It is a further object of the invention to provide a fan and compressor bearing support for such an engine which achieves higher thrust through closer controlled fan and compressor blade tip clearances.

The basic front-fan subassembly of the invention includes an engine outer duct, a row of structural fan stators, a fan rolling element bearing assembly, and fan-related bearing attachment apparatus. The stator radially outermost ends are attached to the engine outer duct. The fan-related apparatus, which is radially positioned generally entirely inward of the stators, attaches the stator radially innermost ends to the fan bearing's outer race. The subassembly also includes a row of structural compressor guide vanes, a compressor rolling element bearing assembly, and compressor-related bearing attachment apparatus. The guide vane radially outermost ends are extended and attached to the engine outer duct. The compressor-related apparatus, which is radially positioned generally entirely inward of the guide vanes, attaches the guide vane radially innermost ends to the compressor bearing's outer race. The subassembly further includes inter-bearing support apparatus, radially positioned generally entirely inward of the stators, which structurally supports an axial load between the fan outer race and the compressor outer race.

The expanded front-fan subassembly of the invention additionally includes a fan shaft, a compressor shaft, and an inner flow path surface. The inner flow path surface has a duct portion which aerodynamically links the stator and guide vane innermost ends. The fan bearing's inner race is attached to the fan shaft and the compressor bearing's inner race is attached to the compressor shaft. In this expanded subassembly, the fan-related apparatus, the compressor-related apparatus, and the inter-bearing support apparatus are each positioned generally entirely on the radially inward side of the inner flow path surface.

Several benefits and advantages are derived from the invention. The airflow-guiding and bearing-support dual-function feature of the structural stators and guide vanes increases engine specific fuel consumption by allowing for the elimination of the conventional engine frames with their heavy weight and low radial spring constant. Because the structural fan stators and structural compressor guide vanes have radial spring constants greater than those of the eliminated conventional engine frames, higher engine thrust and better specific fuel consumption are achieved through closer controlled fan and compressor blade tip clearances.

BRIEF DESCRIPTION OF THE DRAWINGS

The accompanying drawing illustrates a preferred embodiment of the present invention wherein:

DETAILED DESCRIPTION OF THE INVENTION

Figure 1:
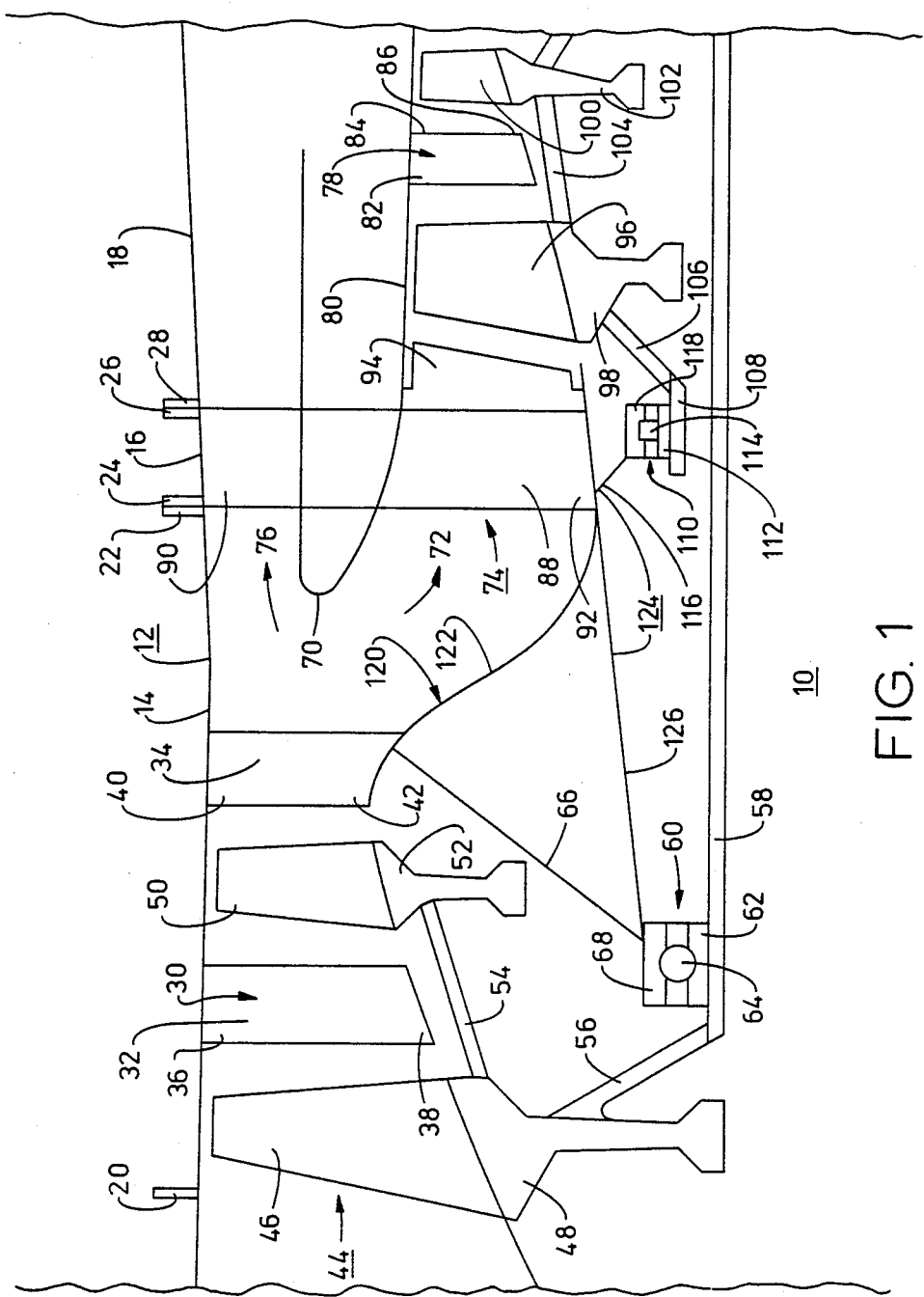
FIG. 1 is a schematic cross-sectional view of a portion of a bypass turbofan jet engine including a subassembly showing the engine's fan and compressor regions.

The bypass turbofan jet engine subassembly 10 of the present invention, as shown in FIG. 1, includes an engine outer duct 12 which defines the engine airflow path outer boundary. The engine outer duct 12 has a fan stator casing portion 14, a middle portion 16, and an aft portion 18. The fan stator casing portion 14 has a forward flange 20 used for attachment of the engine to the airframe and has an aft flange 22 used for attachment to the forward flange 24 of the middle portion 16. It is noted that throughout the description of the present invention, when two parts are said to be "attached", they may be connected together through one or more intermediate connecting structures or they may be connected directly together without any interposing structure. The middle portion 16 has an aft flange 26 used for attachment to the forward flange 28 of the aft portion 18.

The engine outer duct's fan stator casing portion 14 is part of the fan stator assembly 30 which also includes a row of conventional fan stators 32 and a row (typically the aft-most stator row) of structural fan stators 34. The conventional fan stators 32 each have a radially outermost end 36 attached to the engine outer duct's fan stator casing portion 14 and have a radially innermost free end 38. The structural fan stators 34 each have a radially outermost end 40 attached to the engine outer duct's fan stator casing portion 14 and have a radially innermost attached end 42 to be described later. The fan stator assembly 30 is part of the fan 44 which also includes a first row of fan blades 46 attached to a first fan disk 48 and a second row of fan blades 50 attached to a second fan disk 52. A spacer 54 interconnects the two disks 48 and 52. The first fan disk 48 is attached by a disk cone 56 to the fan shaft 58.

A fan rolling element bearing assembly 60 has an inner race 62 which is attached to the fan shaft 58. In an exemplary embodiment, the rolling element is a ball bearing 64. Means 66 are supplied for attaching the radially innermost ends 42 of the structural fan stators 34 to the outer race 68 of the fan rolling element bearing assembly 60. These means 66 are radially disposed generally entirely inward of the structural stators 34. Preferably such fan-related means 66 include a fan inner support cone 66 having one end attached to the radially innermost end 42 of the structural fan stators 34 and having another end attached to the fan outer race 68. Other such means include spokes, tie bars, casings, and the like, and combinations thereof, structurally linking the structural stator innermost ends 42 to the fan outer race 68. It is desirable to dispose the fan rolling element bearing assembly 60, including its outer race 68, entirely longitudinally forward of the row of structural stators 34. A preferred location for such placement of the fan outer race 60 would be proximate the point defined by a perpendicular dropped from the center of mass of the rotatable fan structure (the fan blades 46 and 50, fan disks 48 and 52, and fan disk spacer 54) to the fan shaft 58.

After the fan region, the engine airflow is divided into two paths by a splitter 70. The inner flow path 72 goes through the compressor 74 while the outer flow path 76 bypasses the compressor 74. The compressor 74 includes a compressor guide vane assembly 78 having a compressor guide vane casing 80 and a row of conventional guide vanes 82 each having a radially outermost end 84 attached to the compressor guide vane casing 80 and having a radially innermost free end 86. The compressor 74 also includes a row (typically the forward-most guide vane row) of structural compressor guide vanes 88 each having a radially outermost end 90 extended and attached to the middle portion 16 of the engine outer duct 12 and having a radially innermost attached end 92 to be described later. The structural guide vanes 88 may have attached thereto a variable portion 94 whose pitch (angle to the airflow) may be changed to best meet a particular airflow velocity. The compressor 74 further includes a first row of compressor blades 96 attached to a first compressor disk 98 and a second row of compressor blades 100 attached to a second compressor disk 102. A spacer 104 interconnects the two compressor disks 98 and 102. The first compressor disk 98 is attached by a disk cone 106 to the compressor shaft 108.

A compressor rolling element bearing assembly 110 has an inner race 112 which is attached to the compressor shaft 108. In an exemplary embodiment, the rolling element is a roller bearing 114. Means 116 are supplied for attaching the radially innermost ends 92 of the structural compressor guide vanes 88 to the outer race 118 of the compressor rolling element bearing assembly 110. These means 116 are radially disposed generally entirely inward of the structural guide vanes 88. Preferably such compressor-related means 116 include a compressor inner support cone 116 having one end attached to the radially innermost end 92 of the structural compressor guide vanes 88 and having another end attached to the compressor outer race 118. Other such means include spokes, tie bars, casings, and the like, and combinations thereof, structurally linking the structural guide vane innermost ends 92 to the compressor outer race 118.

The flow path of the engine airflow includes an inner surface 120 having a duct portion 122 aerodynamically linking, and preferably structurally linking, the innermost ends 42 of the structural fan stators 34 with the innermost ends 92 of the structural compressor guide vanes 88.

Means 124 are supplied for structurally supporting an axial load between the fan outer race 68 and the compressor outer race 118. These means 124 are radially disposed generally entirely inward of the structural stators 34. In an exemplary embodiment, these inter-bearing support means 124, together with the fan-related means 66 and the compressor-related means 116 are each disposed generally entirely on the radially inward side of the inner surface 120. Preferably such inter-bearing support means 124 include a tie bar 126 (also known as a tie bar cone) and the previously-discussed compressor inner support cone 116 where the tie bar 126 has one of its ends attached to the fan outer race 68 and the other of its ends attached to one end of the compressor inner support cone 116 and where the compressor inner support cone 116 has its other end attached to the compressor outer race 118. Other such inter-bearing support means include various tie bars, spokes, cones, and the like, and combinations thereof, providing axial load supporting structure between the fan and compressor outer races 68 and 118. For example, the ends of a tie bar may be attached directly to the fan and compressor outer races 68 and 118, or may be attached to any point on the fan and compressor inner support cones 66 and 116, or may be attached in various combinations thereof.

It is noted that the invention eliminates the conventional fan and compressor engine frames and provides in their place a box-like (viewed in an engine schematic cross section) support structure which utilizes a structural fan stator row 34 and a structural compressor guide vane row 88 in a dual support/airflow guiding role which, in one embodiment, attaches their inner ends to the fan and compressor bearing outer races 68 and 118 by inner support cones 66 and 116 and interconnects the two outer races 68 and 116 through use of a tie bar 126.

The foregoing description of a preferred embodiment of the invention has been presented for purposes of illustration. It is not intended to be exhaustive or to limit the invention in the precise form disclosed, (such as a particular number of fan and/or compressor blade and stator and/or guide vane rows) and obviously many modifications and variations are possible in light of the above teaching.

We claim:

1. A bypass turbofan jet engine subassembly comprising:
   (a) an engine outer duct;
   (b) a row of structural fan stators each having a radially outermost end attached to said engine outer duct and each having a radially-innermost end;
   (c) a fan rolling element bearing assembly having a fan outer race;
   (d) fan-related means for attaching said stator innermost ends to said fan outer race, said fan-related means radially disposed generally entirely inward of said stators;
   (e) a row of structural compressor guide vanes each having a radially outermost end extended and attached to said engine outer duct and each having a radially innermost end;
   (f) a compressor rolling element bearing assembly having a compressor outer race;
   (g) compressor-related means for attaching said guide vane innermost ends to said compressor outer race, said compressor-related means radially disposed generally entirely inward of said guide vanes; and
   (h) inter-bearing support means for structurally supporting an axial load between said fan outer race and said compressor outer race, said inter-bearing support means radially disposed generally entirely inward of said stators.

2. A bypass turbofan jet engine subassembly comprising:
   (a) an engine outer duct;
   (b) a row of structural fan stators each having a radially outermost end attached to said engine outer duct and each having a radially innermost end;
   (c) a fan shaft;
   (d) a fan rolling element bearing assembly having a fan inner race attached to said fan shaft and having a fan outer race;
   (e) a row of structural compressor guide vanes each having a radially outermost end extended and attached to said engine outer duct and each having a radially innermost end;
   (f) an inner flow path surface having a duct portion aerodynamically linking said innermost ends of said structural fan stators with said innermost ends of said structural compressor guide vanes;
   (g) fan-related means for attaching said innermost ends of said structural fan stators to said fan outer race of said fan rolling element bearing assembly, said fan-related means disposed generally entirely on the radially inward side of said inner flow path surface;
   (h) a compressor shaft;
   (i) a compressor rolling element bearing assembly having a compressor inner race attached to said compressor shaft and having a compressor outer race;
   (j) compressor-related means for attaching said innermost ends of said structural compressor guide vanes to said compressor outer race of said compressor rolling element bearing assembly, said compressor-related means disposed generally entirely on the radially inward side of said inner flow path surface; and
   (k) inter-bearing support means for structurally supporting an axial load between said fan outer race and said compressor outer race, said inter-bearing support means disposed generally entirely on the radially inward side of said inner flow path surface.

3. The subassembly of claim 1 or 2, wherein said fan-related means comprises a fan inner support cone having two ends, one said fan cone end attached to said radially innermost end of said structural fan stators and another said fan cone end attached to said fan outer race.

4. The subassembly of claim 1 or 2, wherein said compressor-related means comprises a compressor inner support cone having two ends, one said compressor cone end attached to said radially innermost end of said structural compressor guide vanes and another said compressor cone end attached to said compressor outer race.

5. The subassembly of claim 1 or 2, wherein said inter-bearing support means comprises a tie bar and a compressor inner support cone each having two ends, said tie bar having one said tie bar end attached to said fan outer race and having another said tie bar end attached to one said compressor cone end of said compressor inner support cone, and said compressor inner support cone having another said compressor cone end attached to said compressor outer race.

6. The subassembly of claim 1 or 2, wherein:
   (a) said fan-related means comprises a fan inner support cone having two ends, one said fan cone end attached to said radially innermost end of said structural fan stators and another said fan cone end attached to said fan outer race;
   (b) said compressor-related means comprises a compressor inner support cone having two ends, one said compressor cone end attached to said radially innermost end of said structural compressor guide vanes and another said compressor cone end attached to said compressor outer race; and
   (c) said inter-bearing support means comprises a tie bar having two ends and said compressor-related means, said tie bar having one said tie bar end attached to said fan outer race and having another said tie bar end attached to one said compressor cone end of said compressor inner support cone, and said compressor inner support cone having another said compressor cone end attached to said compressor outer race.

7. The subassembly of claim 6, wherein said fan outer race is disposed entirely longitudinally forward of said stator row.

8. The subassembly of claim 1 or 2, wherein said fan outer race is disposed entirely longitudinally forward of said stator row.

* * * * *